Aug. 23, 1927.
J. H. SCHONHOFF
1,640,053
MOWER PITMAN CONNECTION
Filed Aug. 6, 1926
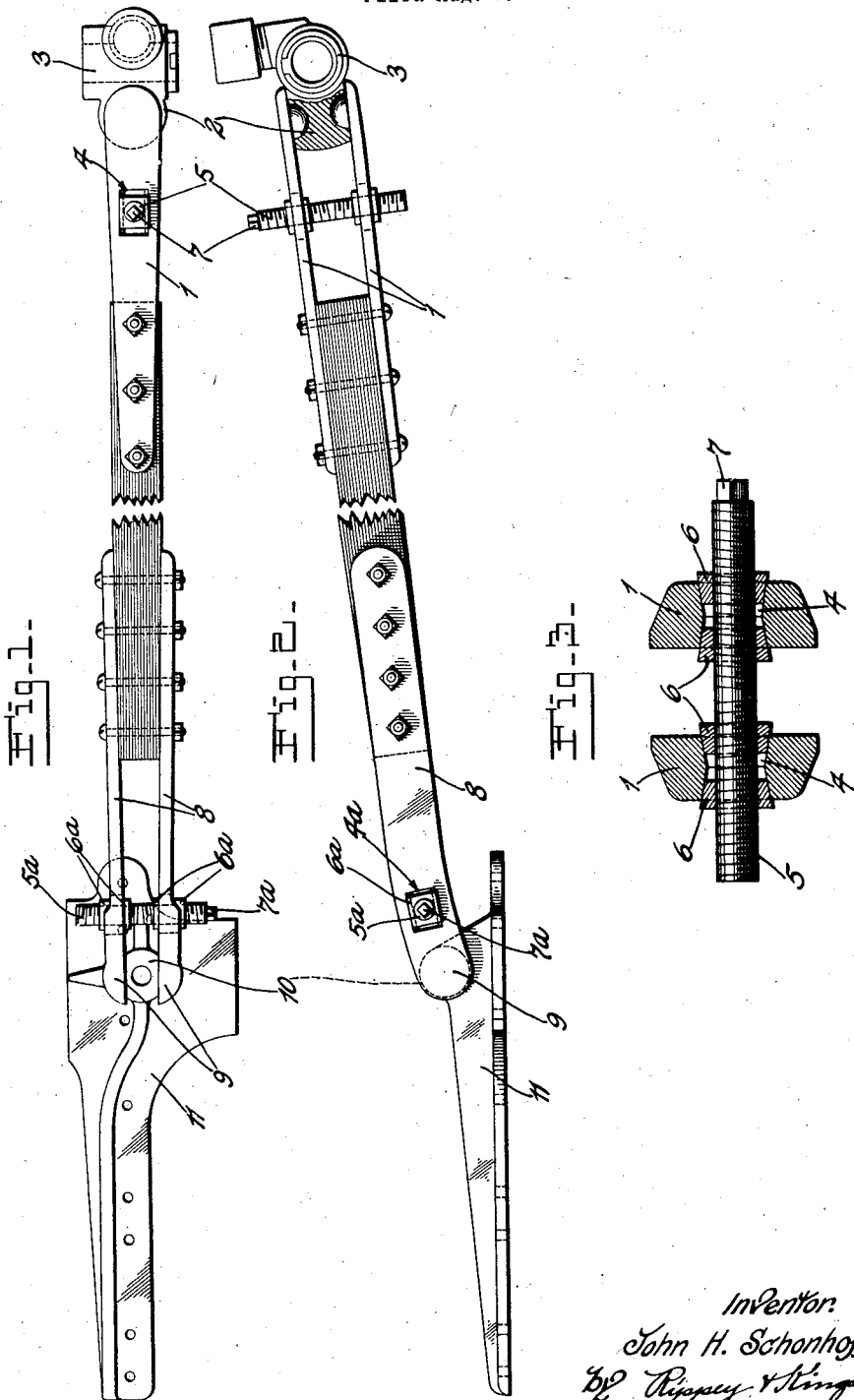
Inventor:
John H. Schonhoff,
By Rippey & Kingsland,
His Attorneys.

Patented Aug. 23, 1927.

1,640,053

UNITED STATES PATENT OFFICE.

JOHN H. SCHONHOFF, OF ADVANCE, MISSOURI.

MOWER PITMAN CONNECTION.

Application filed August 6, 1926. Serial No. 127,538.

This invention relates to mower pitman connections, and an object is to provide means for use in association with the pitman connections of a mower whereby the operation of attaching and disconnecting the pitman is facilitated and expedited.

Another object of the invention is to provide a device for use in cooperation with the connecting arms of a mower pitman by operation of which the connecting arms may be spread apart to permit removal of the pitman, and drawn together to attach the pitman to the operating parts of the mower.

Other objects will appear from the following description taken in connection with the accompanying drawing, in which Fig. 1 is a plan view of a mower pitman having my invention connected therewith.

Fig. 2 is a side elevation.

Fig. 3 is an enlarged cross sectional view of the pitman arms showing my improved spreading and clamping device in connection therewith.

The pitman shown is of familiar construction having on one end a pair of arms 1 designed and adapted to engage a projecting part 2 of a crank connector 3. It is known that the connection between the arms 1 and the part 2 is pivotal and that in the type of pitman rod shown it is necessary to permit pivotal action of the part 2 between the arms 1 and at the same time prevent disengagement of said arms 1 from the part 2 during operation of the mower, and, further to disengage the arms 1 from the part 2 it is necessary to spread the ends of the arms apart.

For these purposes my invention is specially designed and adapted, the same comprising the provision of a hole 4 through each of the arms 1 having parallel upper and lower walls diverging outwardly and diverging inwardly from about the middle of each arm as will be understood by reference to Fig. 3; a bolt 5 provided with right hand threads on one end and left hand threads on the opposite end extending through the holes 4 in the two arms; a pair of polygonal nuts 6 screwed on each threaded end of the bolt having beveled upper and lower walls matching the upper and lower walls of the holes 4 and of slightly greater width than the vertical width of said holes so that the nuts will not pass through the holes 4; and a polygonal part 7 on the end of the bolt 5 for engagement by a wrench or other tool whereby the bolt may be rotated. Rotation of the bolt in one direction will cause the two outer nuts 6 to draw the arms 1 toward each other, and turning of the bolt in the opposite direction will cause the inner nuts 6 to spread apart the arms 1 and disengage said arms from the part 2. Thus, the invention serves to hold the arms in connection with the part 2 and is also operative to spread apart the arms and disengage them from said part 2.

It is known that the opposite end of the pitman is provided with a pair of arms 8 having socket extremities 9 for engagement with the ball member 10 of the mower cycle attachment 11, whereby operation of the pitman imparts rapid reciprocating movements to the cycle. I also apply my invention to the arms 8 and have indicated the parts thereof corresponding to like parts above described by similar reference numerals associated in each instance with the letter "a", thus avoiding unnecessary repetition of description. The device in association with the arms 8 is adjustable to hold the arms in pivotal connection with the ball portion 10 of the cycle attachment and is also operative to spread apart the arms 8 to disengage or detach them from the cycle.

From the foregoing it will be seen that my invention is of a highly simplified and efficient character and may be applied as an attachment to many standard mower pitmen now in general use. The device facilitates the operation of forcing the arms apart to permit detachment of the pitman, and also the operation of drawing the arms toward each other to hold them in proper engagement with the cooperating parts of the machine. The nuts 6 on the inner sides of the arms force the arms apart and the nuts 6 on the outer sides of the arms draw the arms together. The nuts 6 having close contact with the upper and lower walls of the holes 4 are held from working out of proper relationship to each other and to the arms 1 engaged thereby. The specific arrangement may be varied as desired to meet requirements in different structures without departure from the nature and principle of the invention.

I do not restrict myself unessentially, but what I claim and desire to secure by Letters Patent is:—

1. A pitman comprising a pair of flexible spaced arms having holes therethrough, a bolt provided with oppositely running threads on its opposite ends and extending through said holes, and a pair of nuts screwed on each set of threads and engaging respective arms.

2. A pitman comprising a pair of spaced flexible arms each having a polygonal hole therethrough, each of said holes having upper and lower walls diverging from the middle of the hole toward the sides of the arm, a pair of nuts seated in each of said holes, and a bolt provided with right hand threads engaging one pair of nuts and with left hand threads engaging the other pair of nuts.

JOHN H. SCHONHOFF.